United States Patent
Keegan (10) Patent No.: US 12,120,990 B2
(45) Date of Patent: Oct. 22, 2024

(54) PLANT GROW RACK AND WATERING SYSTEM

(71) Applicant: William J. Keegan, Oakdale, CA (US)

(72) Inventor: William J. Keegan, Oakdale, CA (US)

( * ) Notice: Subject to any disclaimer, the term of this patent is extended or adjusted under 35 U.S.C. 154(b) by 452 days.

(21) Appl. No.: 17/676,511

(22) Filed: Feb. 21, 2022

(65) Prior Publication Data

US 2022/0174896 A1 Jun. 9, 2022

Related U.S. Application Data (63) Continuation-in-part of application No. 16/922,286, filed on Jul. 7, 2020, now abandoned.

(51) Int. Cl.
*A01G 25/02* (2006.01)
*A01G 9/12* (2006.01)

(52) U.S. Cl.
CPC ............ *A01G 25/023* (2013.01); *A01G 9/12* (2013.01)

(58) Field of Classification Search
CPC .......... A01G 9/12; A01G 17/06; A91G 25/02; A91G 25/023
See application file for complete search history.

(56) References Cited

U.S. PATENT DOCUMENTS

| | | | | |
|---|---|---|---|---|
| 4,922,653 A * | 5/1990 | Stone | ........... | A01G 17/04 47/45 |
| 5,179,799 A * | 1/1993 | Hillestad | ........... | A01G 9/12 47/45 |
| 5,285,968 A * | 2/1994 | McSheehy | ........... | A01G 25/02 239/DIG. 1 |
| 6,349,502 B1 * | 2/2002 | Fernandez | ........... | A01G 9/12 47/45 |
| 6,453,606 B1 * | 9/2002 | Shulman | ........... | A01G 9/12 211/198 |
| 7,017,299 B1 * | 3/2006 | Speed | ........... | A01G 9/12 47/21.1 |
| 8,615,924 B2 * | 12/2013 | Dinihanian, Jr. | ........... | A01G 13/043 211/198 |
| 11,058,073 B2 * | 7/2021 | Lortscher | ........... | A01G 13/0268 |
| 2005/0145716 A1 * | 7/2005 | Manning | ........... | A01G 25/02 239/145 |
| 2011/0308151 A1 * | 12/2011 | Wu | ........... | A01G 9/12 47/46 |
| 2013/0126643 A1 * | 5/2013 | McLarty | ........... | A01G 25/02 239/553 |
| 2013/0139434 A1 * | 6/2013 | Warren | ........... | A01G 9/12 47/44 |
| 2020/0329644 A1 * | 10/2020 | Wardlaw | ........... | A01G 17/04 |

* cited by examiner

*Primary Examiner* — Brady W Frazier
*Assistant Examiner* — Edgar Reyes
(74) *Attorney, Agent, or Firm* — Bruce A. Lev (57) ABSTRACT

A plant grow rack that includes a base portion having semi-circular bracket and a plurality of stakes and support hooks attached thereto and is adapted to be placed around an existing plant, be pushed into the ground, and hold a semi-circular water supply line above the ground and around the plant to thereby water said plant.

6 Claims, 7 Drawing Sheets

PLANT GROW RACK AND WATERING SYSTEM

CROSS-REFERENCE TO RELATED APPLICATION

The present application is a Continuation-In-Part (CIP) of and claims priority to non-provisional application Ser. No. 16/922,286, filed Jul. 7, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of plant grow racks that include watering and support loops.

2. Description of the Related Art

When a plant grows vertically they tend to become top heavy and fall over to the side and onto the ground which impedes growth and could result in the death of the plant. Furthermore, providing water to such plants can be a tedious and laborious task. Therefore, a need exists to develop a system that can provide proper support and water means throughout the life cycle of these plants.

Various attempts have been made to solve the above-mentioned problems such as those found in Australian Patent 2014208274 to Chang; U.S. Pat. No. 6,840,008 to Bullock et al; and U.S. Pat. No. 8,857,103 to Coon. These prior art references are representative of prior plant support and watering systems. However, none of the above inventions and patents, taken either singly or in combination, is seen to describe the invention as claimed.

BRIEF SUMMARY OF THE INVENTION

In view of the foregoing disadvantages inherent in the known art, the present invention provides plant grow racks with watering and support loops. The general purpose of the present invention, which will be described subsequently in greater detail, is to provide a system that can provide proper support and watering means throughout the life cycle of growing plants.

The instant plant grow racks each include a watering loop and a plurality of support loops stackable thereupon in a vertical direction. A plurality of grow racks can be spaced from one another and connected in series via connectable water hoses to thereby form a watering "daisy chain".

The main features of the instant plant grow racks that is an improvement over the prior art stackable plant grow racks is the way the instant plant grow racks can provide water to a plant while supporting its growth. Furthermore, the instant plant grow racks can provide water and growth support to a plurality of plants simultaneously.

The instant plant grow racks each include a watering loop and successive support loops stackable thereupon. Furthermore, water hoses are connected between each successive watering loop to form a "daisy chain" of stackable plant grow racks for use in any gardening scenario.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention constructed and operative according to the teachings of the present invention.

The various embodiments of the present invention will hereinafter be described in conjunction with the appended drawings.

DESCRIPTION OF THE PREFERRED EMBODIMENT

The preferred embodiment of the present invention relates to stackable plant grow racks and watering system.

Figure 1:
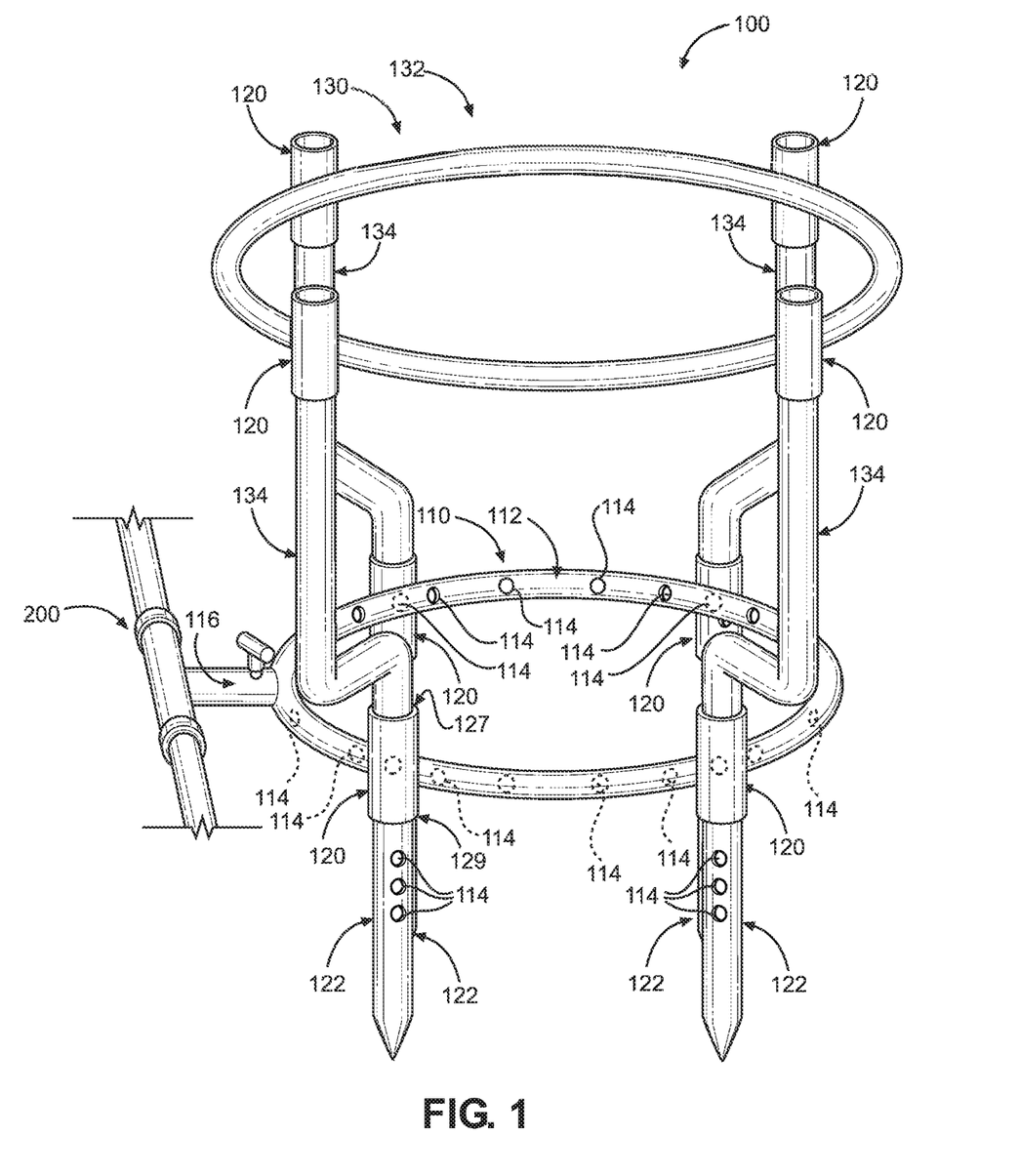
FIG. 1 shows a perspective view illustrating a stackable plant grow rack and watering system according to an embodiment of the present invention.
Figure 2:
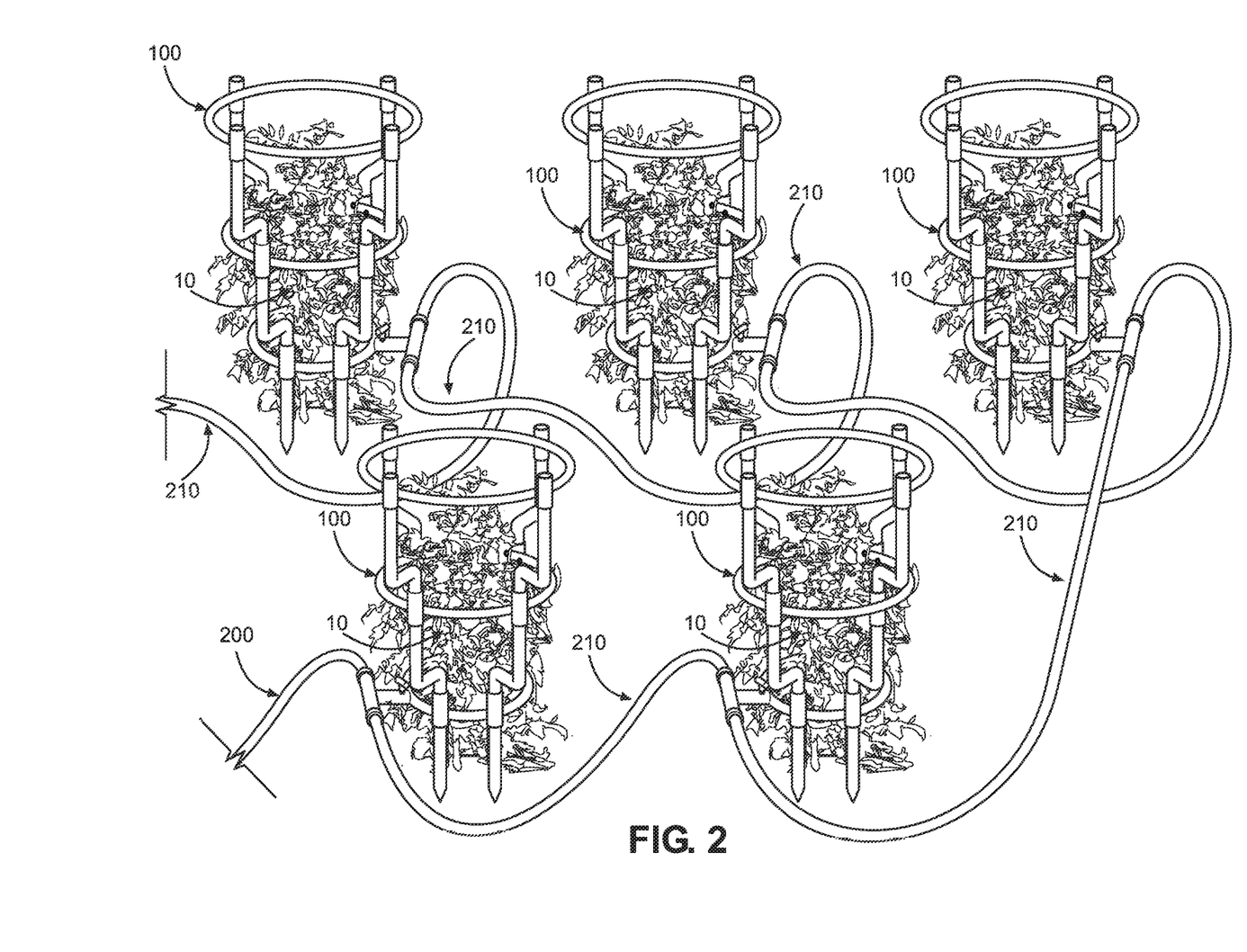
FIG. 2 shows a perspective view illustrating a plurality of stackable plant grow racks and watering system in a daisy chain configuration according to the embodiment of the present invention of FIG. 1.

Referring now to FIGS. 1-2, a system of supporting and watering plants 10 comprises a plurality of stackable plant grow racks 100, each comprising a watering loop 110 including a circulation tube 112 including a plurality of spaced holes 114 therethrough, and an adjustable water flow nozzle 116, wherein the adjustable inflow nozzle is adapted to releasably secure a watering source hose thereto and allow water to pass therethrough and through the circulation tube at a chosen flow rate, wherein the circulation tube is formed having a shape adapted to surround a plant and allow the plant to grow through a center section formed by the shape, wherein the circulation tube is further adapted to support the plant as the plant grows through the center section, and wherein the circulation tube is adapted to allow water to circulate therethrough and exit through the plurality of spaced holes to thereby provide water to the plant while being supported by the stackable plant grow rack. The stackable plant grow racks each further include a plurality of support leg connectors 120, each including a top opening 127, a bottom opening 129; and a hole 114 in a center section thereof, wherein each of the plurality of support leg connectors 120 are hollow, are connected to the circulation tube of the watering loop such that each hole aligns with a respective hole of the circulation tube, are spaced from one another; and are adapted to allow water to pass therethrough; and wherein each of the plurality of support leg connectors are adapted to releasably hold a support leg within the top opening, and releasably hold a base leg within the bottom opening; and a plurality of base legs 122 each including a plurality of spaced holes 114 therethrough, wherein the plurality of base legs are spaced from one another and attached to the watering loop via respective support leg connectors at respective proximal ends thereof, wherein the plurality of base legs are hollow and adapted to allow water to pass from respective support leg connectors therethrough and exit through the plurality of spaced holes to thereby provide water to the plant while being supported by the stackable plant grow rack, and wherein the plurality of base legs 122 are adapted to be inserted into ground soil via respective distal ends thereof to thereby support the watering loop above the ground soil. The stackable plant grow racks each further include at least one support loop 130 comprising a support ring 132 formed having a shape adapted to surround the plant and allow the plant to grow through a center section formed by the shape, wherein the support ring is further adapted to support the plant as the plant grows through the center section, and wherein the center section of the support ring is larger than the center section formed by the circulation tube, such that as the plant grows larger the support ring is adapted to support the growing plant, a plurality of support leg connectors 120 spaced from one another and attached to the support ring and adapted to releasably attach a plurality of support legs thereto, and a plurality of support legs 134 spaced from one another and attached to the support ring via the respective plurality of support leg connectors at respective proximal ends thereof, and wherein the plurality of support legs are adapted to be releasably attached to the plurality of support leg connectors of the circulation tube of the watering loop via respective distal ends thereof to thereby support the support ring above the circulation tube, wherein the at least one support ring is adapted to be placed in concentric alignment with the circulation tube.

The system of supporting and watering plants further comprise a water source hose 200 adapted to be releasably connected to a water source at one end thereof and releasably connected to the adjustable water flow nozzle 116 of the circulation tube of the watering loop of a first of the plurality of stackable plant grow racks at an opposite end thereof; and a plurality of water hoses 210, wherein the plurality of water hoses are adapted to be releasably connected between adjustable water flow nozzles of each stackable plant grow rack, to thereby form an in-series (daisy-chain) watering system between the plurality of stackable plant grow racks 100, and thereby be capable of watering a plurality of plants at the same time.

The at least one support loop 130 may comprise a plurality of support loops 130, wherein the plurality of support loops are adapted to be stacked one on top of another, and wherein each successive support loop has a larger center section than a previous one of the plurality of support loops, such that as the plant grows taller and larger the plurality of support loops are able to support the plant throughout its growth process while the watering loop continues to provide water to the plant. In one embodiment, there are three support leg connectors 120 on the watering loop, three support leg connectors on the at least one support loop, three support legs on the watering loop, and three support legs on the at least one support loop. In another embodiment, there are four support leg connectors on the watering loop, four support leg connectors on the at least one support loop, four support legs on the watering loop, and four support legs on the at least one support loop. In following, there can be four support leg connectors 120 on the watering loop, four support leg connectors on the at least one support loop, four support legs on the watering loop, and four support legs on the at least one support loop.

The shape of the circulation tube of the watering loop may be formed as a circle or a polygon, and the shape of said support ring of the at least one support loop may be formed as a circle or a polygon.

The watering loop and the at least one support loop may be formed from copper, stainless steel, plastic, or polyvinyl chloride. The plurality of support legs of the watering loop is formed having a preferred length of approximately 16 inches, though other dimensions are obvious variations, and wherein the support legs are adapted to be inserted into the ground soil to a depth of approximately 8 inches, though other dimensions are obvious variations. The plurality of support legs of the at least one support loop may be formed having a length of between 6 inches and 8 inches, though other dimensions are obvious variations.

Figure 3:
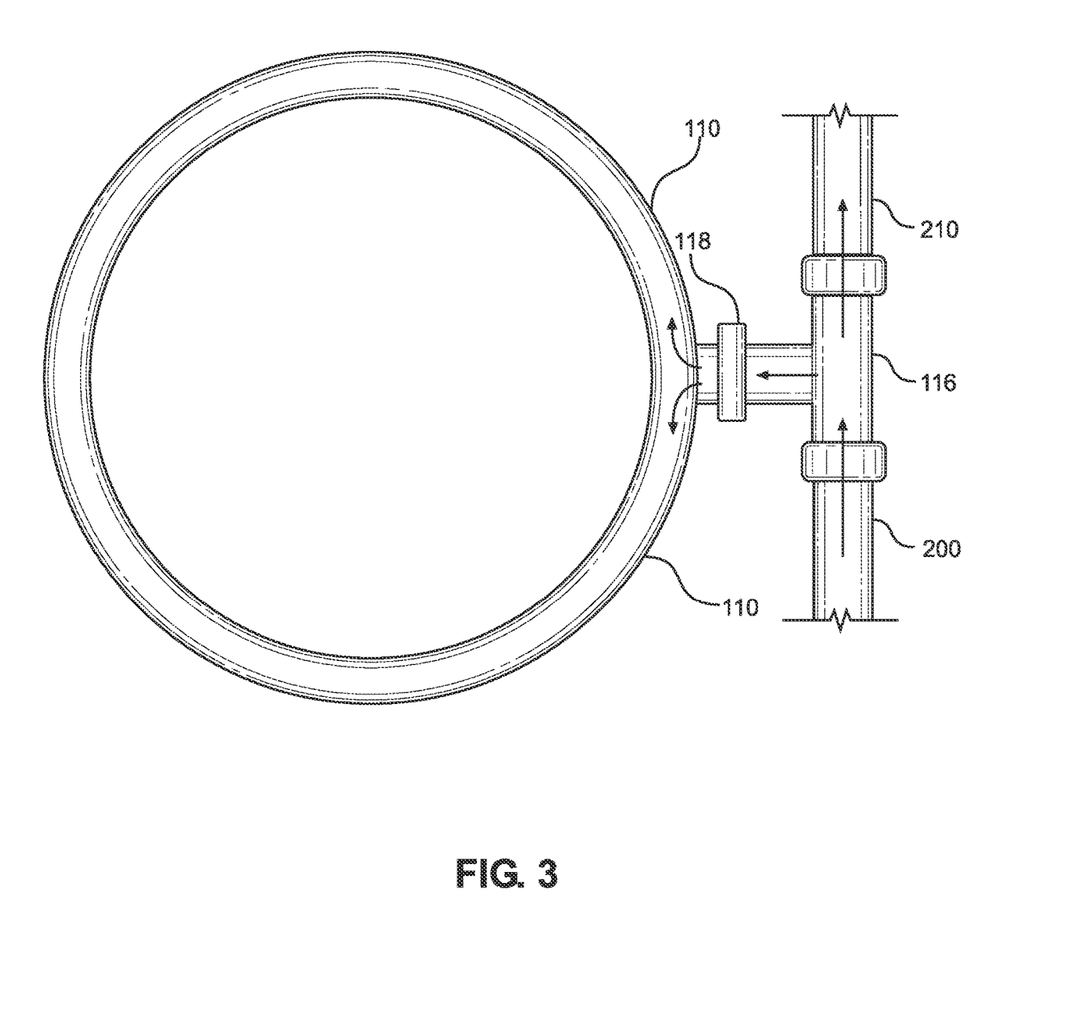
FIG. 3 shows a cross-sectional view of an adjustable water flow nozzle attached to a watering loop according to the embodiment of the present invention of FIG. 1.
Figure 4:
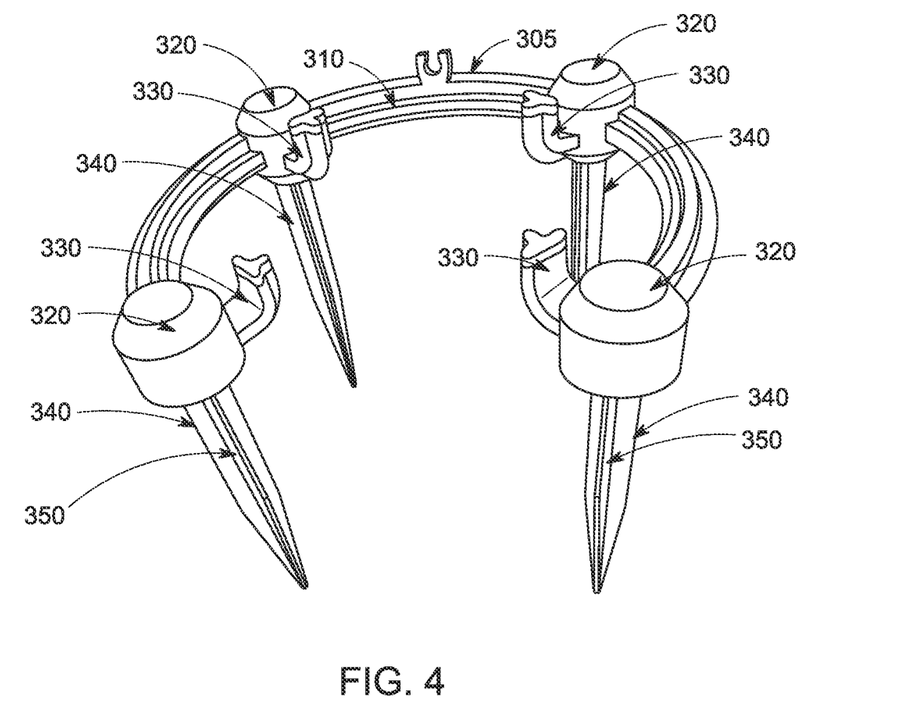
FIG. 4 shows a cross-sectional view of an adjustable water flow nozzle attached to a watering loop according to the embodiment of the present invention of FIG. 1.
Figure 5:
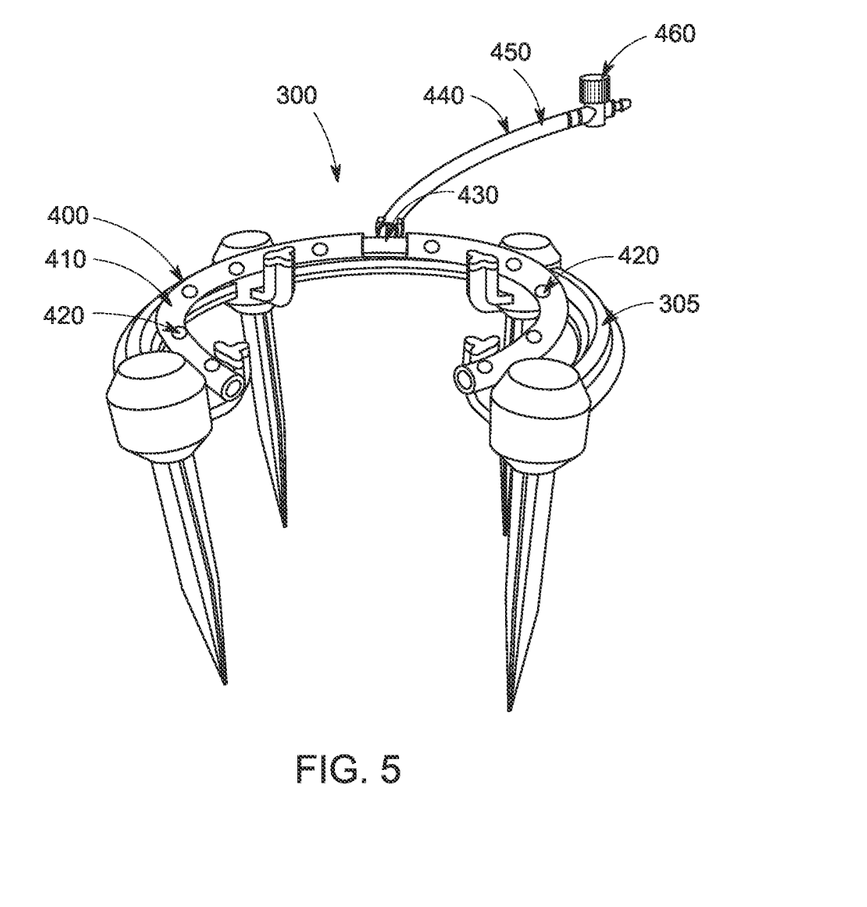
FIG. 5 shows a cross-sectional view of an adjustable water flow nozzle attached to a watering loop according to the embodiment of the present invention of FIG. 1.
Figure 6:
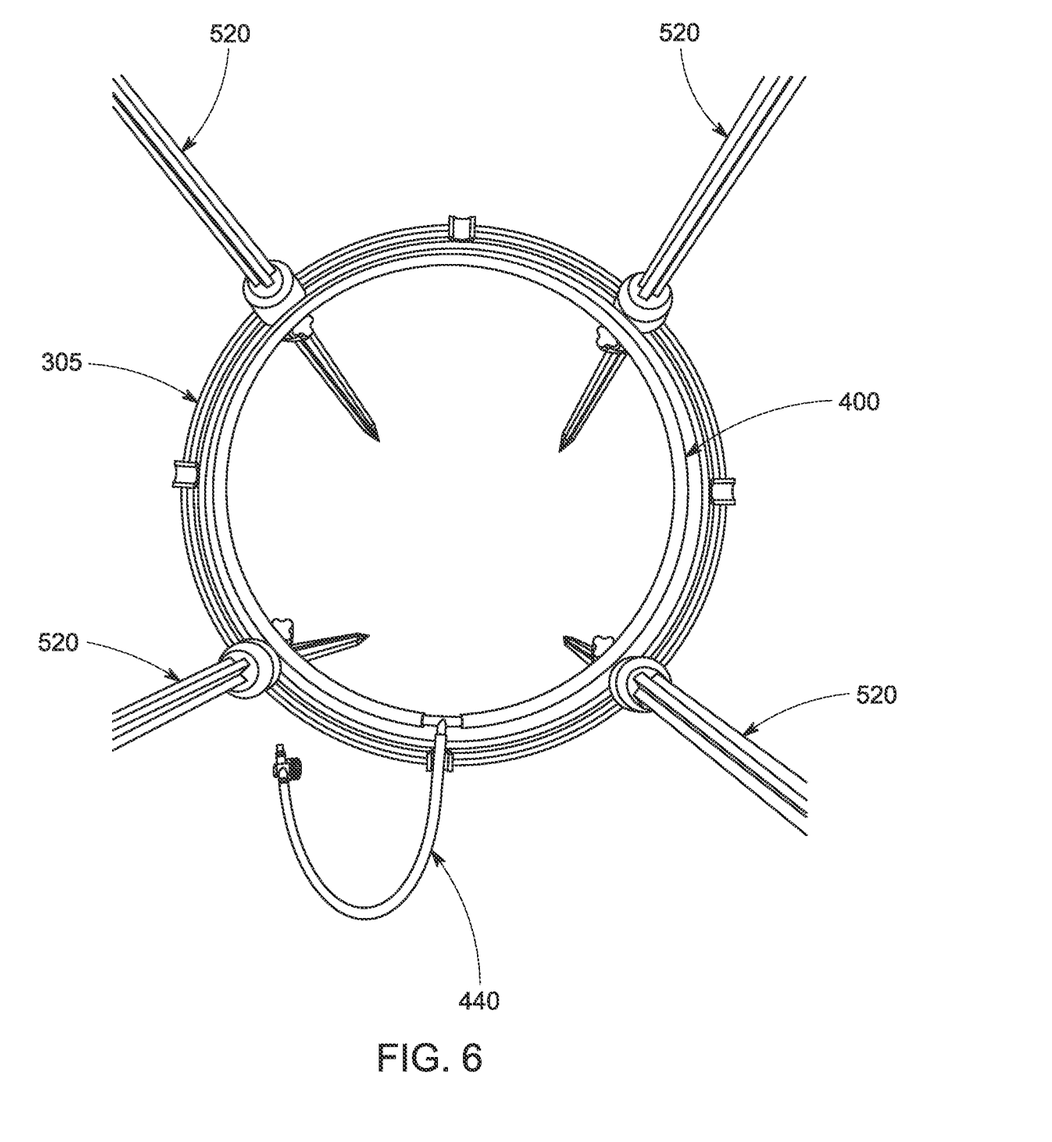
FIG. 6 shows a cross-sectional view of an adjustable water flow nozzle attached to a watering loop according to the embodiment of the present invention of FIG. 1.
Figure 7:
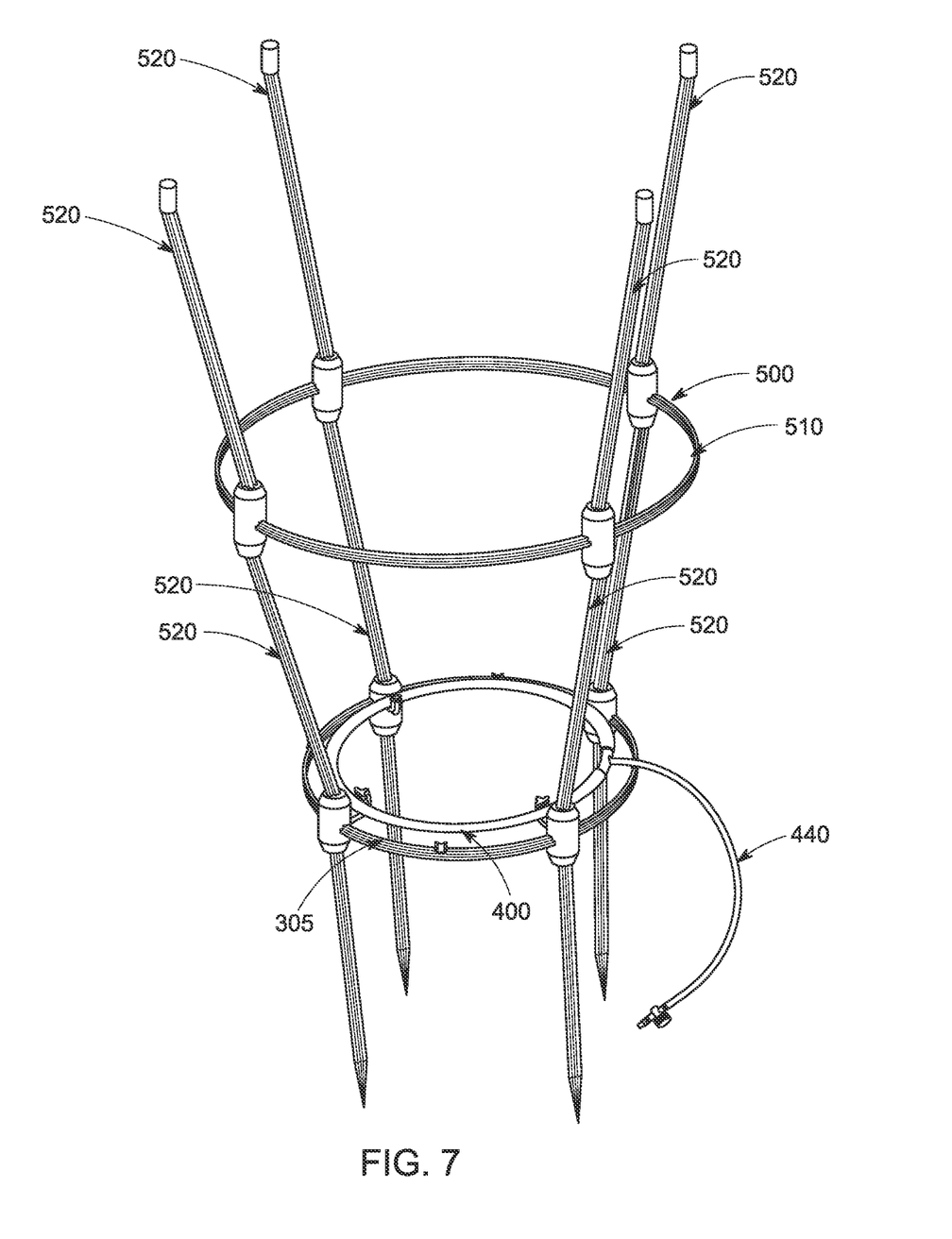
FIG. 7 shows a cross-sectional view of an adjustable water flow nozzle attached to a watering loop according to the embodiment of the present invention of FIG. 1.

In another embodiment, there are five support loops 130, and wherein the respective support rings of the five support loops are adapted to be placed in concentric alignment with each other and the circulation tube. Furthermore, the plurality of support legs 134 can be formed having varying shapes and sizes, including curved, straight, bent, and S-shaped, depending on the type of plants being supported and watered or the size and shape of an existing garden. As such, each of the stackable plant grow racks can have unique shape, such as cone-shaped, or form a rectangular volume, or even odd shapes to properly support plants that take an unexpected growth shape. The number of base legs 122 and support legs 134 can also vary, i.e., 3, 4, or 5, or more, depending on the strength or size of the stackable plant grow racks needed. Furthermore, the plurality of support leg connectors can be formed as known slip joints, coupler joints, slide joints, stackable joints, and sleeve joints. Referring now to FIG. 3, the adjustable water flow nozzle 116 includes a control knob 118 that is rotated to control the water flow rate, water flow arrows shown, to each watering loop 110. As such, the water flow rate to each stackable plant grow rack in a series of stackable plant grow racks can be controlled individually. Within the preferred embodiment the water flow nozzle 116 is T-shaped. However, other shapes, such as Y-shaped, could be used depending on the water flow rates desired or the dimensions and orientations of plants within a garden.

In the preferred embodiment shown in FIGS. 4-7, the plant grow rack 300 comprises a base portion 305 including a semi-circular bracket 310, and a plurality of stakes 340, preferably four, each including a shaft 350 that is tapered to a point at its end and is adapted to be pushed into ground material, a head 320 attached between the shaft and the semi-circular bracket, and a support hook 330 attached to the head and is adapted to releasably hold a water supply line thereon, wherein the plurality of stakes are spaced from one another and are adapted to be pushed into the ground material, and wherein the base portion is adapted to be securely placed around a plant to be watered and hold a water supply line above the ground material; a bracket water line 400 including a semi-circular watering tube 410 including a plurality of spaced holes 420 therethrough, and a water nozzle 430 adapted to connect with and allow water to enter and exit the watering loop, wherein the bracket water line has a semi-circular shape similar to the semi-circular shape of the semi-circular bracket of the base portion, wherein the bracket water line is adapted to be placed upon and held in place by the support hooks of the plurality of stakes of the base portion, and wherein the bracket water line is adapted to allow water to pass therethrough and through the plurality of spaced holes and into the ground material surrounding the plant to be watered; and a main water line 440 including a watering tube 450 including a proximal end adapted to releasably connect to the water nozzle 430 of the bracket water line 400, a distal end, and an adjustable water flow nozzle 460 connected to the distal end of the watering tube 450 and adapted to releasably secure water supply line hoses thereto and allow water to pass into the main water line 440 and the bracket water line 400 at a chosen flow rate, wherein the plant grow rack 300 is adapted to be placed into the ground material around a plant and allow water to pass therethrough and into the ground material surrounding the plant to be watered.

The plant grow rack 300 may further comprise at least one support loop 500 comprising a support ring 510 formed having a shape adapted to surround the plant as it grows through a center section thereof, wherein the support ring has a diameter that is larger than the diameter formed by the semi-circular bracket of the base portion, such that as the plant grows larger the support ring is adapted to support the growing plant; and a plurality of support legs 520, wherein the plurality of support legs are spaced from one another and attached to the support ring 510, and wherein the plurality of support legs are adapted to be releasably attached to respective heads 320 of the plurality of stakes 340, wherein said support ring 510 is spaced vertically from said base portion 305 an amount determined by the length of the plurality of support legs 520. Furthermore, there may also be a plurality of support loops 500 adapted to be stacked one on top of another; and wherein each successive support loop has a larger diameter center section than a previous one of the plurality of support loops, such that as the plant grows taller and larger the plurality of support loops are able to support the plant throughout its growth process while the watering loop continues to provide water to the plant.

The instant plant grow rack 300 may be formed from various materials, such as the base portion from copper, stainless steel, plastic, or polyvinyl chloride, and the bracket water line and the main water line from rubber and/or plastic.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A plant grow rack comprising:
   a base portion including:
      a semi-circular bracket; and
      a plurality of stakes, each including:
         a shaft;
            wherein said shaft is tapered and adapted to be pushed into ground material;
         a head including:
            a support hook;
               wherein said support hook is attached to said head and extends upwardly therefrom and radially inwards with respect to said semi-circular bracket; and
               wherein said support hook releasably holds a bracket water line thereon; and
            wherein said head is attached between said shaft and said semi-circular bracket;
      wherein said plurality of stakes are spaced from one another and adapted to be pushed into said ground material; and
      wherein said base portion is adapted to be securely placed around a plant to be watered and hold a water supply line above said ground material;
   said bracket water line including:
      a semi-circular watering tube including:
         a plurality of spaced holes therethrough; and
         a water nozzle adapted to connect with and allow water to enter and exit said watering loop;
         wherein said bracket water line has a semi-circular shape similar to said semi-circular shape of said semi-circular bracket of said base portion; and
         wherein said bracket water line is placed upon and held in place by said support hooks of said plurality of stakes of said base portion;
      wherein said bracket water line is adapted to allow water to pass therethrough and through said plurality of spaced holes and into said ground material surrounding said plant to be watered; and
   a main water line including:
      a watering tube including:

a proximal end adapted to releasably connect to said water nozzle of said bracket water line; and a distal end; and an adjustable water flow nozzle;

wherein said adjustable water flow nozzle is connected to said distal end of said watering tube and adapted to releasably secure water supply line hoses thereto and allow water to pass into said main water line and said bracket water line at a chosen flow rate;

wherein said plant grow rack is adapted to be placed into said ground material around a plant and allow water to pass therethrough and into said ground material surrounding said plant to be watered.

2. The plant grow rack of claim 1, further comprising:

at least one support loop comprising:

a support ring;

wherein said support ring is formed having a shape adapted to surround said plant as it grows through a center section thereof;

wherein said support ring has a diameter that is larger than the diameter formed by said semi-circular bracket of said base portion, such that as said plant grows larger said support ring is adapted to support said growing plant; and a plurality of support legs;

wherein said plurality of support legs are spaced from one another and attached to said support ring; and wherein said plurality of support legs are adapted to be releasably attached to respective heads of said plurality of stakes;

wherein said support ring is spaced vertically from said base portion an amount determined by the length of said plurality of support legs.

3. The plant grow rack of claim 2, wherein said at least one support loop comprises a plurality of support loops; wherein said plurality of support loops are adapted to be stacked one on top of another; and wherein each successive support loop has a larger diameter center section than a previous one of said plurality of support loops, such that as said plant grows taller and larger said plurality of support loops are able to support said plant throughout its growth process while said watering loop continues to provide water to said plant.

4. The plant grow rack of claim 1, wherein said base portion is formed from a material chosen from a group of materials consisting of copper, stainless steel, plastic, and polyvinyl chloride.

5. The plant grow rack of claim 1, wherein said bracket water line and said main water line are formed from a material chosen from a group of materials consisting of rubber and plastic.

6. The plant grow rack of claim 1, wherein said base portion comprises four said stakes evenly spaced from one another.

* * * * *